United States Patent
Wang et al.

(10) Patent No.: US 11,009,365 B2
(45) Date of Patent: May 18, 2021

(54) LANE MARKING LOCALIZATION

(71) Applicant: TuSimple, Inc., San Diego, CA (US)

(72) Inventors: Mingdong Wang, San Diego, CA (US); Chenzhe Qian, San Diego, CA (US); Xue Mei, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 318 days.

(21) Appl. No.: 15/896,077

(22) Filed: Feb. 14, 2018

(65) Prior Publication Data

US 2020/0271473 A1     Aug. 27, 2020

(51) Int. Cl.
*G05D 1/02*     (2020.01)
*G06F 17/10*   (2006.01)
(Continued)

(52) U.S. Cl.
CPC ......... *G01C 21/3602* (2013.01); *G01C 21/32* (2013.01); *G01S 13/89* (2013.01); *G01S 17/89* (2013.01); *G01S 19/13* (2013.01)

(58) Field of Classification Search
CPC ..... G01C 21/3602; G01C 21/32; G01S 19/13; G01S 17/89; G01S 13/89
See application file for complete search history.

(56) References Cited

U.S. PATENT DOCUMENTS 6,084,870 A  7/2000 Wooten et al.
6,263,088 B1 7/2001 Crabtree et al.
(Continued)

FOREIGN PATENT DOCUMENTS

CN   106340197 A   1/2017
CN   106781591 A   5/2017
(Continued)

OTHER PUBLICATIONS

Carle, Patrick J.F., "Global Rover Localization by Matching Lidar and Orbital 3D Maps.", IEEE, Anchorage Convention Distriction, pp. 1-6, May 3-8, 2010. (Anchorage Alaska, US), May 3-8, 2019.
(Continued)

*Primary Examiner* — Harry Y Oh
(74) *Attorney, Agent, or Firm* — Paul Liu; Perkins Cole, LLP

(57) ABSTRACT

Various embodiments of the present disclosure provide a system and method for lane marking localization that may be utilized by autonomous or semi-autonomous vehicles traveling within the lane. In an embodiment, the system comprises a locating device adapted to determine the vehicle's geographic location; a database; a region map; a response map; a camera; and a computer connected to the locating device, database, and camera, wherein the computer is adapted to: receive the region map, wherein the region map corresponds to a specified geographic location; generate the response map by receiving information from the camera, the information relating to the environment in which the vehicle is located; identifying lane markers observed by the camera; and plotting identified lane markers on the response map; compare the response map to the region map; and generate a predicted vehicle location based on the comparison of the response map and the region map.

20 Claims, 5 Drawing Sheets

(51) Int. Cl.
    *G06G 7/78* (2006.01)
    *G01C 21/36* (2006.01)
    *G01C 21/32* (2006.01)
    G01S 13/89 (2006.01)
    G01S 17/89 (2020.01)
    G01S 19/13 (2010.01)

(56) References Cited

U.S. PATENT DOCUMENTS

| | | |
|---|---|---|
| 6,594,821 B1 | 7/2003 | Banning et al. |
| 6,777,904 B1 | 8/2004 | Degner et al. |
| 6,975,923 B2 | 12/2005 | Spriggs |
| 7,103,460 B1 | 9/2006 | Breed |
| 7,689,559 B2 | 3/2010 | Canright et al. |
| 7,742,841 B2 | 6/2010 | Sakai et al. |
| 7,783,403 B2 | 8/2010 | Breed |
| 7,844,595 B2 | 11/2010 | Canright et al. |
| 8,041,111 B1 | 10/2011 | Wilensky |
| 8,064,643 B2 | 11/2011 | Stein et al. |
| 8,082,101 B2 | 12/2011 | Stein et al. |
| 8,164,628 B2 | 4/2012 | Stein et al. |
| 8,175,376 B2 | 5/2012 | Marchesotti et al. |
| 8,271,871 B2 | 9/2012 | Marchesotti |
| 8,346,480 B2 | 1/2013 | Trepagnier et al. |
| 8,378,851 B2 | 2/2013 | Stein et al. |
| 8,392,117 B2 | 3/2013 | Dolgov et al. |
| 8,401,292 B2 | 3/2013 | Park et al. |
| 8,412,449 B2 | 4/2013 | Trepagnier et al. |
| 8,478,072 B2 | 7/2013 | Aisaka et al. |
| 8,553,088 B2 | 10/2013 | Stein et al. |
| 8,706,394 B2 | 4/2014 | Trepagnier et al. |
| 8,718,861 B1 | 5/2014 | Montemerlo et al. |
| 8,788,134 B1 | 7/2014 | Litkouhi et al. |
| 8,908,041 B2 | 12/2014 | Stein et al. |
| 8,917,169 B2 | 12/2014 | Schofield et al. |
| 8,963,913 B2 | 2/2015 | Baek |
| 8,965,621 B1 | 2/2015 | Urmson et al. |
| 8,981,966 B2 | 3/2015 | Stein et al. |
| 8,983,708 B2 | 3/2015 | Choe et al. |
| 8,993,951 B2 | 3/2015 | Schofield et al. |
| 9,002,632 B1 | 4/2015 | Emigh |
| 9,008,369 B2 | 4/2015 | Schofield et al. |
| 9,025,880 B2 | 5/2015 | Perazzi et al. |
| 9,042,648 B2 | 5/2015 | Wang et al. |
| 9,081,385 B1 | 7/2015 | Ferguson et al. |
| 9,088,744 B2 | 7/2015 | Grauer et al. |
| 9,111,444 B2 | 8/2015 | Kaganovich |
| 9,117,133 B2 | 8/2015 | Barnes et al. |
| 9,118,816 B2 | 8/2015 | Stein et al. |
| 9,120,485 B1 | 9/2015 | Dolgov |
| 9,122,954 B2 | 9/2015 | Srebnik et al. |
| 9,134,402 B2 | 9/2015 | Sebastian et al. |
| 9,145,116 B2 | 9/2015 | Clarke et al. |
| 9,147,255 B1 | 9/2015 | Zhang et al. |
| 9,156,473 B2 | 10/2015 | Clarke et al. |
| 9,176,006 B2 | 11/2015 | Stein |
| 9,179,072 B2 | 11/2015 | Stein et al. |
| 9,183,447 B1 | 11/2015 | Gdalyahu et al. |
| 9,185,360 B2 | 11/2015 | Stein et al. |
| 9,191,634 B2 | 11/2015 | Schofield et al. |
| 9,214,084 B2 | 12/2015 | Grauer et al. |
| 9,219,873 B2 | 12/2015 | Grauer et al. |
| 9,233,659 B2 | 1/2016 | Rosenbaum et al. |
| 9,233,688 B2 | 1/2016 | Clarke et al. |
| 9,248,832 B2 | 2/2016 | Huberman |
| 9,248,835 B2 | 2/2016 | Tanzmeister |
| 9,251,708 B2 | 2/2016 | Rosenbaum et al. |
| 9,277,132 B2 | 3/2016 | Berberian |
| 9,280,711 B2 | 3/2016 | Stein |
| 9,282,144 B2 | 3/2016 | Tebay et al. |
| 9,286,522 B2 | 3/2016 | Stein et al. |
| 9,297,641 B2 | 3/2016 | Stein |
| 9,299,004 B2 | 3/2016 | Lin et al. |
| 9,315,192 B1 | 4/2016 | Zhu et al. |
| 9,317,033 B2 | 4/2016 | Ibanez-Guzman et al. |
| 9,317,776 B1 | 4/2016 | Honda et al. |
| 9,330,334 B2 | 5/2016 | Lin et al. |
| 9,342,074 B2 | 5/2016 | Dolgov et al. |
| 9,347,779 B1 | 5/2016 | Lynch |
| 9,355,635 B2 | 5/2016 | Gao et al. |
| 9,365,214 B2 | 6/2016 | Ben Shalom et al. |
| 9,399,397 B2 | 7/2016 | Mizutani et al. |
| 9,418,549 B2 | 8/2016 | Kang et al. |
| 9,428,192 B2 | 8/2016 | Schofield et al. |
| 9,436,880 B2 | 9/2016 | Bos et al. |
| 9,438,878 B2 | 9/2016 | Niebla et al. |
| 9,443,163 B2 | 9/2016 | Springer |
| 9,446,765 B2 | 9/2016 | Ben Shalom et al. |
| 9,459,515 B2 | 10/2016 | Stein |
| 9,466,006 B2 | 10/2016 | Duan |
| 9,476,970 B1* | 10/2016 | Fairfield .............. G05D 1/0268 |
| 9,483,839 B1 | 11/2016 | Kwon et al. |
| 9,490,064 B2 | 11/2016 | Hirosawa et al. |
| 9,494,935 B2 | 11/2016 | Okumura et al. |
| 9,507,346 B1 | 11/2016 | Levinson et al. |
| 9,513,634 B2 | 12/2016 | Pack et al. |
| 9,531,966 B2 | 12/2016 | Stein et al. |
| 9,535,423 B1 | 1/2017 | Debreczeni |
| 9,538,113 B2 | 1/2017 | Grauer et al. |
| 9,547,985 B2 | 1/2017 | Tuukkanen |
| 9,549,158 B2 | 1/2017 | Grauer et al. |
| 9,552,657 B2 | 1/2017 | Ueno |
| 9,555,803 B2 | 1/2017 | Pawlicki et al. |
| 9,568,915 B1 | 2/2017 | Berntorp et al. |
| 9,587,952 B1 | 3/2017 | Slusar |
| 9,599,712 B2 | 3/2017 | Van Der Tempel et al. |
| 9,600,889 B2 | 3/2017 | Boisson et al. |
| 9,602,807 B2 | 3/2017 | Crane et al. |
| 9,612,123 B1 | 4/2017 | Levinson et al. |
| 9,620,010 B2 | 4/2017 | Grauer et al. |
| 9,625,569 B2 | 4/2017 | Lange |
| 9,628,565 B2 | 4/2017 | Stenneth et al. |
| 9,649,999 B1 | 5/2017 | Amireddy et al. |
| 9,652,860 B1 | 5/2017 | Maali et al. |
| 9,669,827 B1 | 6/2017 | Ferguson et al. |
| 9,672,446 B1 | 6/2017 | Vallespi-Gonzalez |
| 9,690,290 B2 | 6/2017 | Prokhorov |
| 9,701,023 B2 | 7/2017 | Zhang et al. |
| 9,712,754 B2 | 7/2017 | Grauer et al. |
| 9,720,418 B2 | 8/2017 | Stenneth |
| 9,723,097 B2 | 8/2017 | Harris et al. |
| 9,723,099 B2 | 8/2017 | Chen et al. |
| 9,723,233 B2 | 8/2017 | Grauer et al. |
| 9,726,754 B2 | 8/2017 | Massanell et al. |
| 9,729,860 B2 | 8/2017 | Cohen et al. |
| 9,738,280 B2 | 8/2017 | Rayes |
| 9,739,609 B1 | 8/2017 | Lewis |
| 9,746,550 B2 | 8/2017 | Nath et al. |
| 9,753,128 B2 | 9/2017 | Schweizer et al. |
| 9,753,141 B2 | 9/2017 | Grauer et al. |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |
| 9,779,276 B2 | 10/2017 | Todeschini et al. |
| 9,785,149 B2 | 10/2017 | Wang et al. |
| 9,805,294 B2 | 10/2017 | Liu et al. |
| 9,810,785 B2 | 11/2017 | Grauer et al. |
| 9,823,339 B2 | 11/2017 | Cohen |
| 9,842,399 B2 | 12/2017 | Yamaguchi |
| 9,953,236 B1 | 4/2018 | Huang et al. |
| 10,147,193 B2 | 12/2018 | Huang et al. |
| 10,223,806 B1 | 3/2019 | Luo et al. |
| 10,223,807 B1 | 3/2019 | Luo et al. |
| 10,410,055 B2 | 9/2019 | Wang et al. |
| 10,816,354 B2 | 10/2020 | Liu |
| 2001/0051845 A1* | 12/2001 | Itoh ..................... B62D 5/0493 701/43 |
| 2003/0114980 A1 | 6/2003 | Klausner et al. |
| 2003/0174773 A1 | 9/2003 | Comaniciu et al. |
| 2004/0264763 A1 | 12/2004 | Mas et al. |
| 2007/0088497 A1 | 4/2007 | Jung |
| 2007/0183661 A1 | 8/2007 | El-Maleh et al. |

(56) References Cited

U.S. PATENT DOCUMENTS

| | | |
|---|---|---|
| 2007/0183662 A1 | 8/2007 | Wang et al. |
| 2007/0230792 A1 | 10/2007 | Shashua et al. |
| 2007/0286526 A1 | 12/2007 | Abousleman et al. |
| 2008/0109118 A1* | 5/2008 | Schwartz ........... G06K 9/00798 701/1 |
| 2008/0249667 A1 | 10/2008 | Horvitz et al. |
| 2009/0040054 A1 | 2/2009 | Wang et al. |
| 2009/0087029 A1 | 4/2009 | Coleman et al. |
| 2010/0049397 A1 | 2/2010 | Liu et al. |
| 2010/0082238 A1* | 4/2010 | Nakamura ............. G01C 21/32 701/532 |
| 2010/0111417 A1 | 5/2010 | Ward et al. |
| 2010/0226564 A1 | 9/2010 | Marchesotti et al. |
| 2010/0281361 A1 | 11/2010 | Marchesotti |
| 2011/0142283 A1 | 6/2011 | Huang et al. |
| 2011/0206282 A1 | 8/2011 | Aisaka et al. |
| 2011/0247031 A1 | 10/2011 | Jacoby |
| 2012/0041636 A1 | 2/2012 | Johnson et al. |
| 2012/0105639 A1 | 5/2012 | Stein et al. |
| 2012/0140076 A1 | 6/2012 | Rosenbaum et al. |
| 2012/0274629 A1 | 11/2012 | Baek |
| 2012/0314070 A1 | 12/2012 | Zhang et al. |
| 2013/0051613 A1 | 2/2013 | Bobbitt et al. |
| 2013/0083959 A1 | 4/2013 | Owechko et al. |
| 2013/0182134 A1 | 7/2013 | Grundmann et al. |
| 2013/0204465 A1 | 8/2013 | Phillips et al. |
| 2013/0266187 A1 | 10/2013 | Bulan et al. |
| 2013/0329052 A1 | 12/2013 | Chew |
| 2014/0063489 A1* | 3/2014 | Steffey ................. G01S 17/89 356/72 |
| 2014/0072170 A1 | 3/2014 | Zhang et al. |
| 2014/0104051 A1 | 4/2014 | Breed |
| 2014/0142799 A1 | 5/2014 | Ferguson et al. |
| 2014/0143839 A1 | 5/2014 | Ricci |
| 2014/0145516 A1 | 5/2014 | Hirosawa et al. |
| 2014/0198184 A1 | 7/2014 | Stein et al. |
| 2014/0321704 A1 | 10/2014 | Partis |
| 2014/0334668 A1 | 11/2014 | Saund |
| 2015/0062304 A1 | 3/2015 | Stein et al. |
| 2015/0127239 A1* | 5/2015 | Breed .................. B60W 30/00 701/70 |
| 2015/0253428 A1* | 9/2015 | Holz .................. G01S 17/36 356/5.01 |
| 2015/0269437 A1 | 9/2015 | Maruyama et al. |
| 2015/0269438 A1 | 9/2015 | Samarasekera et al. |
| 2015/0292891 A1 | 10/2015 | Kojo |
| 2015/0310370 A1 | 10/2015 | Burry et al. |
| 2015/0353082 A1 | 12/2015 | Lee et al. |
| 2016/0008988 A1 | 1/2016 | Kennedy et al. |
| 2016/0026787 A1 | 1/2016 | Nairn et al. |
| 2016/0037064 A1 | 2/2016 | Stein et al. |
| 2016/0046290 A1 | 2/2016 | Aharony et al. |
| 2016/0094774 A1 | 3/2016 | Li et al. |
| 2016/0118080 A1 | 4/2016 | Chen |
| 2016/0125608 A1* | 5/2016 | Sorstedt .................. B60R 1/00 348/148 |
| 2016/0129907 A1 | 5/2016 | Kim et al. |
| 2016/0165157 A1 | 6/2016 | Stein et al. |
| 2016/0191860 A1 | 6/2016 | Jung |
| 2016/0210528 A1 | 7/2016 | Duan |
| 2016/0275766 A1 | 9/2016 | Venetianer et al. |
| 2016/0321381 A1 | 11/2016 | English et al. |
| 2016/0334230 A1 | 11/2016 | Ross et al. |
| 2016/0342837 A1 | 11/2016 | Hong et al. |
| 2016/0347322 A1 | 12/2016 | Clarke et al. |
| 2016/0375907 A1 | 12/2016 | Erban |
| 2017/0053169 A1 | 2/2017 | Cuban et al. |
| 2017/0061632 A1 | 3/2017 | Lindner et al. |
| 2017/0124476 A1 | 5/2017 | Levinson et al. |
| 2017/0134631 A1 | 5/2017 | Zhao et al. |
| 2017/0177951 A1 | 6/2017 | Yang et al. |
| 2017/0227647 A1* | 8/2017 | Baik ................... G01S 17/89 |
| 2017/0301104 A1 | 10/2017 | Qian et al. |
| 2017/0305423 A1 | 10/2017 | Green |
| 2017/0318407 A1 | 11/2017 | Meister et al. |
| 2018/0005407 A1* | 1/2018 | Browning ........... B60W 30/095 |
| 2018/0111274 A1 | 4/2018 | Seaok |
| 2018/0131924 A1* | 5/2018 | Jung .................. G06K 9/00798 |
| 2018/0149739 A1* | 5/2018 | Becker .................... G01S 13/89 |
| 2018/0151063 A1 | 5/2018 | Pun et al. |
| 2018/0158197 A1 | 6/2018 | Dasgupta et al. |
| 2018/0188043 A1* | 7/2018 | Chen ........................ G06T 7/70 |
| 2018/0216943 A1* | 8/2018 | Hawkins ............... G05D 1/0246 |
| 2018/0260956 A1 | 9/2018 | Huang et al. |
| 2018/0283892 A1 | 10/2018 | Behrendt |
| 2018/0284278 A1* | 10/2018 | Russell ................... G01S 17/42 |
| 2018/0315201 A1 | 11/2018 | Cameron |
| 2018/0364717 A1* | 12/2018 | Douillard ............. G05D 1/0212 |
| 2018/0373254 A1* | 12/2018 | Song ..................... G01C 21/20 |
| 2018/0373980 A1 | 12/2018 | Huval |
| 2019/0025853 A1 | 1/2019 | Julian |
| 2019/0063945 A1 | 2/2019 | Liu |
| 2019/0065863 A1 | 2/2019 | Luo et al. |
| 2019/0066329 A1 | 2/2019 | Luo et al. |
| 2019/0066330 A1 | 2/2019 | Luo et al. |
| 2019/0108384 A1 | 4/2019 | Wang et al. |
| 2019/0132391 A1 | 5/2019 | Thomas et al. |
| 2019/0132392 A1 | 5/2019 | Liu et al. |
| 2019/0210564 A1 | 7/2019 | Han et al. |
| 2019/0210613 A1 | 7/2019 | Sun et al. |
| 2019/0226851 A1* | 7/2019 | Nicosevici ......... G06K 9/00791 |
| 2019/0236950 A1 | 8/2019 | Li et al. |
| 2019/0266420 A1 | 8/2019 | Ge et al. |
| 2019/0339084 A1* | 11/2019 | Korenaga ............... G01C 21/30 |

FOREIGN PATENT DOCUMENTS

| | | |
|---|---|---|
| CN | 108010360 A | 5/2018 |
| DE | 2608513 A1 | 9/1977 |
| EP | 0890470 A2 | 1/1999 |
| EP | 1754179 A1 | 2/2007 |
| EP | 2448251 A2 | 5/2012 |
| EP | 2463843 A2 | 6/2012 |
| EP | 2761249 A1 | 8/2014 |
| EP | 2918974 A1 | 9/2015 |
| EP | 2946336 A2 | 11/2015 |
| EP | 2993654 A1 | 3/2016 |
| EP | 3081419 A1 | 10/2016 |
| KR | 100802511 B1 | 2/2008 |
| WO | 1991009375 A1 | 6/1991 |
| WO | 2005098739 A1 | 10/2005 |
| WO | 2005098751 A1 | 10/2005 |
| WO | 2005098782 A1 | 10/2005 |
| WO | 2010109419 A1 | 9/2010 |
| WO | 2013045612 A1 | 4/2013 |
| WO | 2014111814 A2 | 7/2014 |
| WO | 2014166245 A1 | 10/2014 |
| WO | 2014201324 A1 | 12/2014 |
| WO | 2015083009 A1 | 6/2015 |
| WO | 2015103159 A1 | 7/2015 |
| WO | 2015125022 A2 | 8/2015 |
| WO | 2015186002 A2 | 12/2015 |
| WO | 2016090282 A1 | 6/2016 |
| WO | 2016135736 A2 | 9/2016 |
| WO | 2017013875 A1 | 1/2017 |
| WO | 2017079349 A1 | 5/2017 |
| WO | 2017079460 A2 | 5/2017 |
| WO | 2018132608 A2 | 7/2018 |
| WO | 2019040800 A1 | 2/2019 |
| WO | 2019084491 A1 | 5/2019 |
| WO | 2019084494 A1 | 5/2019 |
| WO | 2019140277 A2 | 7/2019 |
| WO | 2019168986 A1 | 9/2019 |
| WO | 2020097512 A2 | 5/2020 |

OTHER PUBLICATIONS

Young, Lee W., International Application No. PCT/US19/18113 Search Report and Written Opinion dated May 8, 2019. (pp. 1-13).

Caselitz, T. et al., "Monocular camera localization in 3D LiDAR maps," European Conference on Computer Vision (2014) Computer

(56) References Cited

OTHER PUBLICATIONS

Vision—ECCV 2014. ECCV 2014. Lecture Notes in Computer Science, vol. 8690. Springer, Cham.
Mur-Artal, R. et al., "ORB-SLAM: A Versatile and Accurate Monocular SLAM System," IEEE Transaction on Robotics, Oct. 2015, pp. 1147-1163, vol. 31, No. 5, Spain.
Sattler, T. et al., "Are Large-Scale 3D Models Really Necessary for Accurate Visual Localization?" CVPR, IEEE, 2017, pp. 1-10.
Engel J., et al., LSD-SLAM: Large-Scale Direct Monocular SLAM. In: Fleet D., Pajdla T., Schiele B., Tuytelaars T. (eds) Computer Vision— ECCV 2014. ECCV 2014. Lecture Notes in Computer Science, vol. 8690. Springer, Cham.
Levinson, Jesse et al., Experimental Robotics, Unsupervised Calibration for Multi-Beam Lasers, pp. 179-194, 12th Ed., Oussama Khatib, Vijay Kumar, Gaurav Sukhatme (Eds.) Springer-Verlag Berlin Heidelberg 2014.
International Application No. PCT/US2019/013322, International Search Report and Written Opinion dated Apr. 2, 2019.
International Application No. PCT/US19/12934, International Search Report and Written Opinion dated Apr. 29, 2019.
International Application No. PCT/US18/53795, International Search Report and Written Opinion dated Dec. 31, 2018.
International Application No. PCT/US18/57484, International Search Report and Written Opinion dated Jan. 7, 2019.
International Application No. PCT/US2018/057851, International Search Report and Written Opinion dated Feb. 1, 2019.
International Application No. PCT/US2019/019839, International Search Reort and Written Opinion dated May 23, 2019.
International Application No. PCT/US19/25995, International Search Report and Written Opinion dated Jul. 9, 2019.
Geiger, Andreas et al., "Automatic Camera and Range Sensor Calibration using a single Shot", Robotics and Automation (ICRA), pp. 1-8, 2012 IEEE International Conference.
Zhang, Z. et al. A Flexible new technique for camera calibration. IEEE Transactions on Pattern Analysis and Machine Intelligence ( vol. 22 , Issue: 11 , Nov. 2000).
International Application No. PCT/US2018/047830, International Search Report and Written Opinion dated Apr. 27, 2017.
Bar-Hillel, Aharon et al. "Recent progress in road and lane detection: a survey." Machine Vision and Applications 25 (2011): 727-745.
Schindler, Andreas et al. "Generation of high precision digital maps using circular arc splines," 2012 IEEE Intelligent Vehicles Symposium, Alcala de Henares, 2012, pp. 246-251. doi: 10.1109/IVS.2012.6232124.
International Application No. PCT/US2018/047608, International Search Report and Written Opinion dated Dec. 28, 2018.
Hou, Xiaodi and Zhang, Liqing, "Saliency Detection: A Spectral Residual Approach", Computer Vision and Pattern Recognition, CVPR'07—IEEE Conference, pp. 1-8, 2007.
Hou, Xiaodi and Hare!, Jonathan and Koch, Christof, "Image Signature: Highlighting Sparse Salient Regions", IEEE Transactions on Pattern Analysis and Machine Intelligence, vol. 34, No. 1, pp. 194-201, 2012.
Hou, Xiaodi and Zhang, Liqing, "Dynamic Visual Attention: Searching for Coding Length Increments", Advances in Neural Information Processing Systems, vol. 21, pp. 681-688, 2008.
Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302.5985, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.
Li, Yanghao and Wang, Naiyan and Liu, Jiaying and Hou, Xiaodi, "Demystifying Neural Style Transfer", arXiv preprint arXiv:1701.01036, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.
Li, Yanghao and Wang, Naiyan and Liu, Jiaying and Hou, Xiaodi, "Factorized Bilinear Models for Image Recognition", arXiv preprint arXiv:1611.05709, 2016.
Hou, Xiaodi, "Computational Modeling and Psychophysics in Low and Mid-Level Vision", California Institute of Technology, 2014.
Spinello, Luciano, Triebel, Rudolph, Siegwart, Roland, "Multiclass Multimodal Detection and Tracking in Urban Environments", Sage Journals, vol. 29 Issue 12, pp. 1498-1515 Article first published online: Oct. 7, 2010; Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.
Kyoungho Ahn, Hesham Rakha, "The Effects of Route Choice Decisions on Vehicle Energy Consumption and Emissions", Virginia Tech Transportation Institute, Blacksburg, VA 24061, date unknown.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.
Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dutt Grauman, Kristen, "Active Image Segmentation Propagation", In Proceedings of the IEEE Conference on Computer Vision and Pattern Recognition (CVPR), Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv:1703.04977v1 [cs.CV] Mar. 15, 2017.
Wei, Junqing, John M. Dolan, Bakhtiar Litkhouhi, "A Prediction- and Cost Function-Based Algorithm for Robust Autonomous Free-

(56) References Cited

OTHER PUBLICATIONS way Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
Kyoungho Ahn, Hesham Rakha, "The Effects of Route Choice Decisions on Vehicle Energy Consumption and Emissions", Virginia Tech Transportation Institute, date unknown.
Office Action Mailed in Chinese Application No. 201810025516.X, dated Sep. 3, 2019.
Luo, Yi et al. U.S. Appl. No. 15/684,389 Notice of Allowance dated Oct. 9, 2019.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
International Search Report and Written Opinion for PCT/US19/060547, dated Jun. 25, 2020.
E. de la Rosa Rivera, International application No. PCT/US2019/060547 International Search Report and Written Opinion, dated Jun. 25, 2020, pp. 1-23.
Harry Y. Oh, U.S. Appl. No. 16/184,926, Non-Final Office Action dated Oct. 5, 2020, pp. 1-17.

\* cited by examiner

LANE MARKING LOCALIZATION

BACKGROUND OF THE INVENTION

1. Field of Invention

The present disclosure relates to unmanned vehicle guidance and, more specifically, a system for and method of sensing a roadway lane.

2. Description of Related Art

Global Positioning System ("GPS") technology is widely used as a means for locating an automobile upon a roadway. As autonomous and semi-autonomous vehicles become more advanced, accurately knowing the vehicle's position in the roadway becomes critical. For example, self-driving cars by Volvo and Tesla have been easily confused by faded lane markers and other shabby road conditions. Further, current GPS technology is inaccurate. To achieve a fully autonomous self-driving vehicle requires the ability of a computer to determine the vehicle's lateral position within a roadway with great precision. Additionally, advanced driver-assistance systems ("ADAS") benefit greatly from this ability. For example, lane keeping assistance ("LKA") systems, lane departure warning ("LDW") systems, and lane change assistance systems would be greatly benefited by accurately knowing the vehicle's lateral position within a lane. Other examples of ADAS systems include adaptive cruise control, adaptive light control, anti-lock braking systems, automatic parking, blind spot monitoring, collision avoidance systems, intersection detection, lane departure warning systems, parking sensors, turning assistance, and wrong-way driving warning.

A vehicle may utilize various levels of autonomous driving. For example, a first level of autonomous driving may assist a human driver during some driving tasks such as steering or engine acceleration/deceleration. A second level of autonomous driving may conduct some steering and acceleration/deceleration while the human driver monitors the driving environment and controls the remaining driving tasks. Such a system is referred to as a partially automated system. A third level of autonomous driving may conduct driving tasks and monitor the driving environment, but the human driver must be ready to retake control when the automated system requests. Such a system is generally referred to as a conditionally automated system. A fourth level of autonomous driving may drive the vehicle and monitor road conditions; the human driver does not need to take control but the system may only operate in specific conditions and environments such as inside of a factory, on a closed road course, or within a bounded area. Such a system is referred to as a highly automated system. A fifth level of autonomous driving may perform all driving and road-monitoring tasks in all driving conditions. Such a system is referred to as a fully-automated system.

Current technology relies on GPS technology to determine a vehicle's lateral position within a roadway. However, this method is susceptible to a high amount of drift—the lateral area around the vehicle that is within the technology's margin of error. The amount of drift in a given system is dependent on many factors including signal strength and the precision of the GPS hardware being used. Typical GPS devices aimed at the average consumer have a drift of about 10 meters. Even with the most precise instruments having the best signal strength, a system experiences a drift of 1-2 meters or more, which is unacceptable for self-driving vehicles.

To improve the accuracy of GPS positioning, current technology also employs an inertial measurement unit ("IMU"). An IMU is an electronic device that measures and reports a vehicle's specific force and angular rate using a combination of accelerometers and gyroscopes. However, even while being augmented with IMU's, current lateral locating methods and systems still experience a high amount of drift. For such a system to be useful in a self-driving vehicle, the resolution needs to be approximately 10 cm or less.

Therefore, what is needed is a system that can utilize GPS information and determine a vehicle's lateral position within a roadway with great accuracy. This need has heretofore remained unsatisfied.

SUMMARY OF THE INVENTION

The present disclosure overcomes these and other deficiencies of the prior art by providing a method for determining a vehicle's location comprising the steps of approximating the vehicle's region, receiving a region map from a database, wherein the region map corresponds to the vehicle's approximated region and comprises a plurality of region points indicating an expected roadway lane, receiving a response image generated by an imaging device, the response image comprising information relating to the vehicle's environment, generating a response map from the response image, the response map comprising a plurality of response points indicating the vehicle's location, comparing the response map to the region map, and predicting the vehicle's location based on the differences between the response points and the region points.

In another exemplary embodiment of the present disclosure, the vehicle's region may be approximated using a GPS device or an IMU device.

In another exemplary embodiment of the present disclosure, the step of generating a response map further comprises the steps of detecting lane markers in the response image, the lane markers pertaining to physical aspects contained in the response image, and plotting the response points on the response map, the response points indicating locations of the lane markers.

In another exemplary embodiment of the present disclosure, the method may further comprise the step of generating a confidence score.

In another exemplary embodiment of the present disclosure, the response image may be generated from radar sensing equipment, LIDAR sensing equipment, GPS sensing information, and/or images.

In another exemplary embodiment of the present disclosure, the region map and the response map may be compared at a selected frequency.

In another exemplary embodiment of the present disclosure, the selected frequency may be at least 20 cycles per second.

In another exemplary embodiment of the present disclosure, the method may further comprise the step of outputting the vehicle's predicted location to an ADAS.

In another exemplary embodiment of the preset disclosure, the imaging devices may comprise a plurality of imaging devices, each adapted to perceive different aspects of the vehicle's environment.

In overcoming the limitations currently available in the art, another exemplary embodiment provides a system for determining a vehicle's location on a roadway comprising a locating device adapted to determine a vehicle's geographic region, a database comprising a plurality of region maps, the region maps comprising a plurality of region points, an imaging device adapted to perceive information relating to the vehicle's environment, a processor operably connected to the locating device, the database, and the imaging device, the processor, at a predetermined frequency, adapted to receive, from the locating device, the vehicle's determined geographic region, receive, from the database, the region map corresponding to the vehicle's determined geographic region, receive, from the imaging device, information perceived relating to the vehicle's environment, generate a response map, the response map comprising a plurality of response points corresponding to lane markers detected within the response map, compare the response map to the region map, and determine the vehicle's predicted location based on the comparison of the region map and response map.

In another exemplary embodiment of the present disclosure, the locating device may comprise a GPS device or an IMU device.

In another exemplary embodiment of the present disclosure, the imaging device may comprise a camera or a LIDAR device.

In another exemplary embodiment of the present disclosure, the predetermined frequency is at least 20 cycles per second.

In another exemplary embodiment of the present invention, the processor may be further configured to output the vehicle's predicted location to an ADAS.

In another exemplary embodiment of the present disclosure, the processor may be further configured to determine a confidence score.

In another exemplary embodiment of the present disclosure, the system may further comprise a plurality of imaging devices, each adapted to perceive different aspects of the vehicle's environment.

In some embodiments, the present disclosure provides various vehicle systems the ability to recognize and track lane markings, which, in turn, may be used to allow onboard monitors to detect and/or correct the vehicle's location. For example, the present disclosure may interact with a lane keeping assistance ("LKA") system, lane departure warning ("LDW") system, and lane change assistance system. Such examples may utilize the present disclosure because such systems need to know the relative position the vehicles within the ego-lane and/or the lane to the left/right.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present disclosure, the objects and advantages thereof, reference is now made to the ensuing descriptions taken in connection with the accompanying drawings briefly described as follows.

DETAILED DESCRIPTION OF EMBODIMENTS

Figure 1:
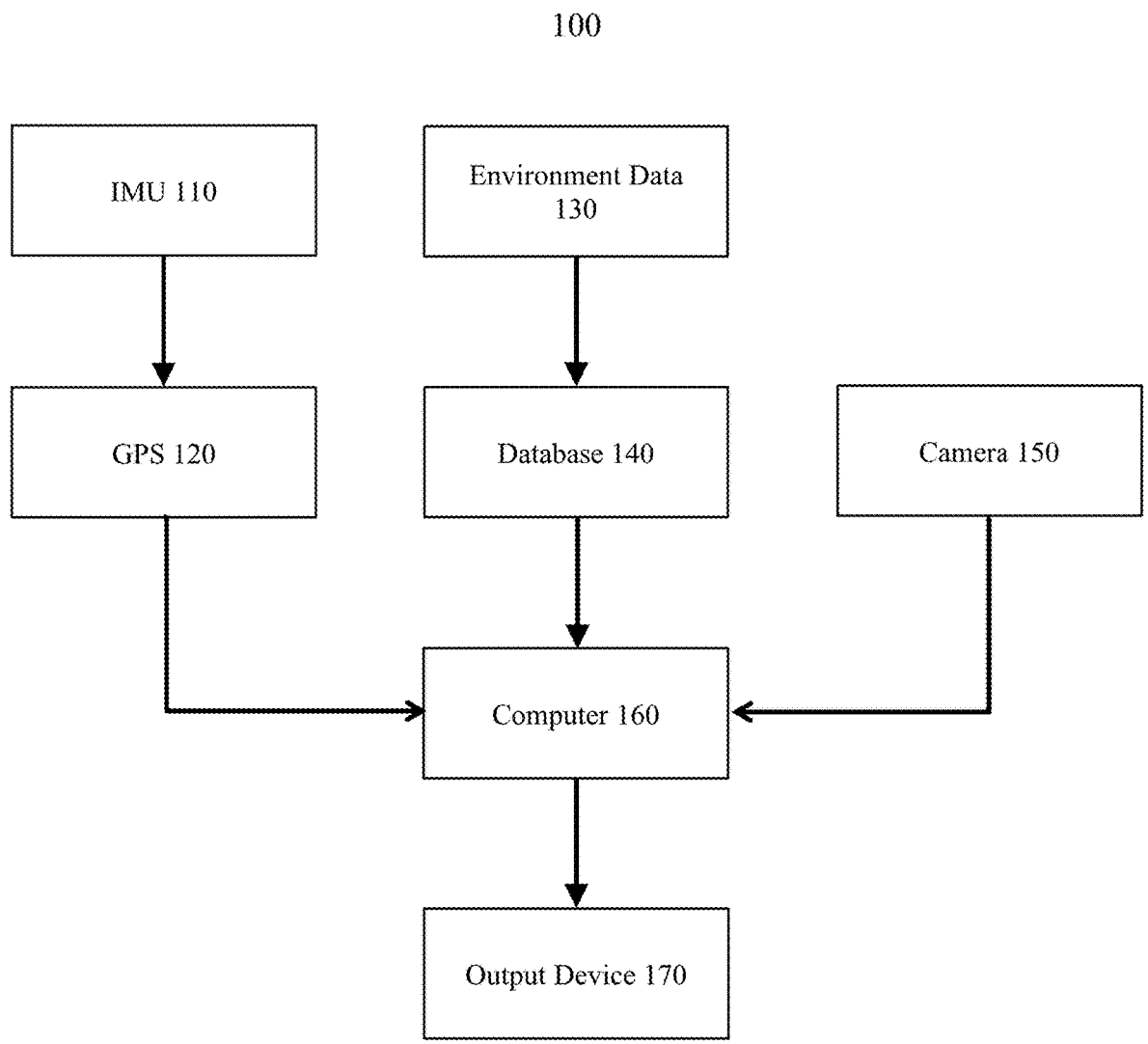
FIG. 1 illustrates a system for determining a vehicle's position within a lane, according to an exemplary embodiment of the present disclosure.

Further features and advantages of the disclosure, as well as the structure and operation of various embodiments of the disclosure, are described in detail below with reference to the accompanying FIGS. 1-4. Although the disclosure is described in the context of a generic vehicle, the term vehicle refers to any type of motorized ground transport including, but not limited to, cars, trucks, carts, sleds, lifts, and rovers.

In an exemplary embodiment of the present disclosure, the system utilizes hardware including a camera, a database, and a computer, to iteratively update the vehicle's predicted location and to determine the vehicle's position relative to the lane of traffic in which it is traveling. In one embodiment, the camera is installed on the vehicle and its position and view angle are predetermined relative to the rest of the vehicle on which it is installed. For example, the camera may be installed on the roof of the vehicle at the centerline of the vehicle, and pointed in the direction of travel, i.e., forward, such that the camera is out of the view of the driver. The computer is configured to include the camera's position and orientation relative to the vehicle. The computer fetches data from the camera and generates a response map. The response map is generated by identifying and locating lane indicators depicted the camera's data. The computer fetches data from the database, including a region map. The region map comprises information previously gathered by a collection vehicle equipped with lane sensing devices including radar, LIDAR, GPS, and cameras. In such an embodiment, the collection vehicle, along with the equipment thereon, accurately determines the collection vehicle's location in relation to lane markers. Such lane markers include traditional lane markings such as lines painted in a roadway and reflectors. Lane markers may also include permanent or semi-permanent structures such as raised curbs, barricades, retaining walls, roadway shoulders, roadway barriers, bridges, buildings, street signs, tunnels, trees, any support structures thereof.

The present disclosure utilizes the collection vehicle's accurately determined roadway position relative to lane markers as a baseline to determine a subsequent vehicle's location within the same roadway at a similar longitudinal roadway position. For example, the subsequent vehicle may be referred to as the "target vehicle." As the target vehicle moves down a roadway, it captures information to generate the response map. The response map comprises information similar to that of a region map. The target vehicle may have a lateral position within the roadway different from that of the collection vehicle's lateral position at the same longitudinal roadway position. The present disclosure determines the target vehicle's location within the roadway by comparing the response map—the location information captured by the target vehicle—against the region map—the location information captured by collection vehicle. In doing so, the target vehicle's lateral roadway position is accurately determined relative to (1) the lane indicators perceived by target vehicle and (2) the collection vehicle's accurately determined roadway position relative to the same lane indicators.

The computer compares the response map against the region map to determine a confidence score. The confidence score is a numerical representation of the differences between the response map and the region map; the greater the difference, the lower the confidence score. If the confidence score is below a predetermined threshold, the computer generates the vehicle's predicted position. The predicted position is generated by comparing the region map against the response map and determining the vehicle's likely position based on the relative perspectives of the response map and the region map. In another embodiment, the computer generates the vehicle's predicted position at any confidence score. The system may output the updated location information to another system. For example, the system may output the updated location information to the vehicle's self-driving automation system and/or an ADAS system installed on the vehicle. In another example, the system may output the updated location information to a database or another vehicle. Such a system may be implemented as part of an automated self-driving system that steers the vehicle in response to the updated location information. In another embodiment, such a system may be implemented as part of an ADAS.

In an exemplary embodiment of the present disclosure and with reference to FIG. 1, a system 100 is utilized as part of a vehicle to determine the vehicle's location within a lane. The system may comprise a GPS device 120 to provide an approximation of the vehicle's actual location and an IMU 110 to estimate the vehicle's speed and velocity. The system may also comprise a database 140 comprising environment data 130. The environment data 130 may comprise a plurality of region maps. The system may also comprise a camera 150 configured to perceive information relating to the vehicle's environment. The system may also comprise a computer 160 and an output device 170.

In an embodiment, the GPS device 120 gathers information comprising the latitude, longitude, and/or the position of the vehicle. In another embodiment, the GPS information comprises the vehicle's yaw angle and/or direction of travel. In another embodiment, the GPS information comprises a time and date stamp. The GPS device 120 may receive information from orbiting satellites that are widely used in the current state of the art. General GPS signaling and positioning is readily apparent to one skilled in the art.

The database 140 comprises environment data 130 obtained using GPS and/or radar, and/or light detection and ranging ("LIDAR"), and/or photographic cameras, and/or videographic cameras. In such an embodiment, a collection vehicle (not shown) comprises equipment including radar, LIDAR, GPS, and cameras. The equipment installed on the collection vehicle accurately gathers location information as it is driven down a roadway. This location information is uploaded to the database 140 and is used to create the environment data 130. The environment data 130 is used to identify physical structures that aid the system in determining a vehicle's position relative to those structures. For example, the environment data 130 may comprise location information relating to lane markers including lane separators, lane markings, and reflectors. In such an embodiment, the collection vehicle accurately determines its physical location relative to the lane markers. In another embodiment, the environment data 130 further comprises data relating to permanent or semi-permanent structures including bridges, signs, buildings, barriers, street lights, raised curbs, trees, support structures thereof, and other physical structures. In one embodiment, the database 140 is located remotely. In another embodiment, the database 140 is located on the vehicle. In another embodiment, the database 140 may comprise a plurality of local or remote databases, communicatively connected to one-another and to the computer 160.

The camera 150 may be installed on the vehicle having any orientation or view angle. For example, the camera 150 may be installed such that it points in the direction of travel, i.e., towards the front of the vehicle. In another embodiment, the camera 150 may be installed such that it points in a direction other than the direction of travel, i.e., towards the rear or sides of the vehicle. In one embodiment, the camera 150 comprises a video camera gathering video at a predetermined rate. In another embodiment, the camera 150 comprises a video camera with frame rate of at least 20 frames per second. In another embodiment, the camera 150 comprises a photographic camera capturing images at a predetermined rate. In an embodiment, the camera 150 comprises a photographic camera capturing images at rate of at least 10 frames per second. In another embodiment, the camera 150 may be configured to capture information beyond that visible to the human eye. For example, the camera 150 may be configured to capture infrared light and/or ultraviolet light. While a camera is disclosed herein, the disclosed subject matter is not limited to a camera comprising a lens and/or a light sensor or film. For example, the camera 150 may be a depth sensor. In such an embodiment, the camera 150 comprises a light-emitting device and a sensor capable of detecting the light emitted from that device. In such an embodiment, light-emitting device emits a plurality of beams of light, for example, infrared laser beams. The plurality of infrared lasers reflect light off of various surfaces and structures, for example, roadway reflectors and lane markers. The camera's 150 sensor detects the infrared lasers and generates a depth map of the environment perceived by the camera 150. Further, as disclosed here, the camera 150 may comprise a plurality of cameras pointed in the same or differing directions. In such an embodiment, the plurality of cameras may be installed at different locations on the vehicle.

The present disclosure includes a computer 160 for processing the data from the GPS 120, the database 140, and the camera 150. The computer 160 generates the vehicle's predicted location by comparing the vehicle's approximate location fetched from the GPS 120, the environment data 130 fetched from the database 140, and the information gathered from the camera 150. The environment data may include a region map (not shown). In one embodiment, the system uses the GPS 120 to determine an approximate location of the vehicle. The computer 160 fetches environment data 130 relating to the vehicle's approximate location, as determined by the GPS 120. The computer 160 fetches data from the camera 150. The computer 160 determines the vehicle's predicted location by comparing the environment data 130 against the data fetched from the camera 150.

In another embodiment, the computer 160 also determines a confidence score that correlates to how well the data fetched from the camera 150 matches the environment data 130 fetched from the GPS 120 and the database 140.

After the computer 160 determines the vehicle's predicted location, the computer 160 may output that information to an output device 170. For example, the computer 160 may output the vehicle's predicted location to self-driving automation system. In another embodiment, the computer 160 may output the vehicle's predicted location to an ADAS. In another embodiment, the computer 160 may output the vehicle's predicted location to a database.

Figure 2:
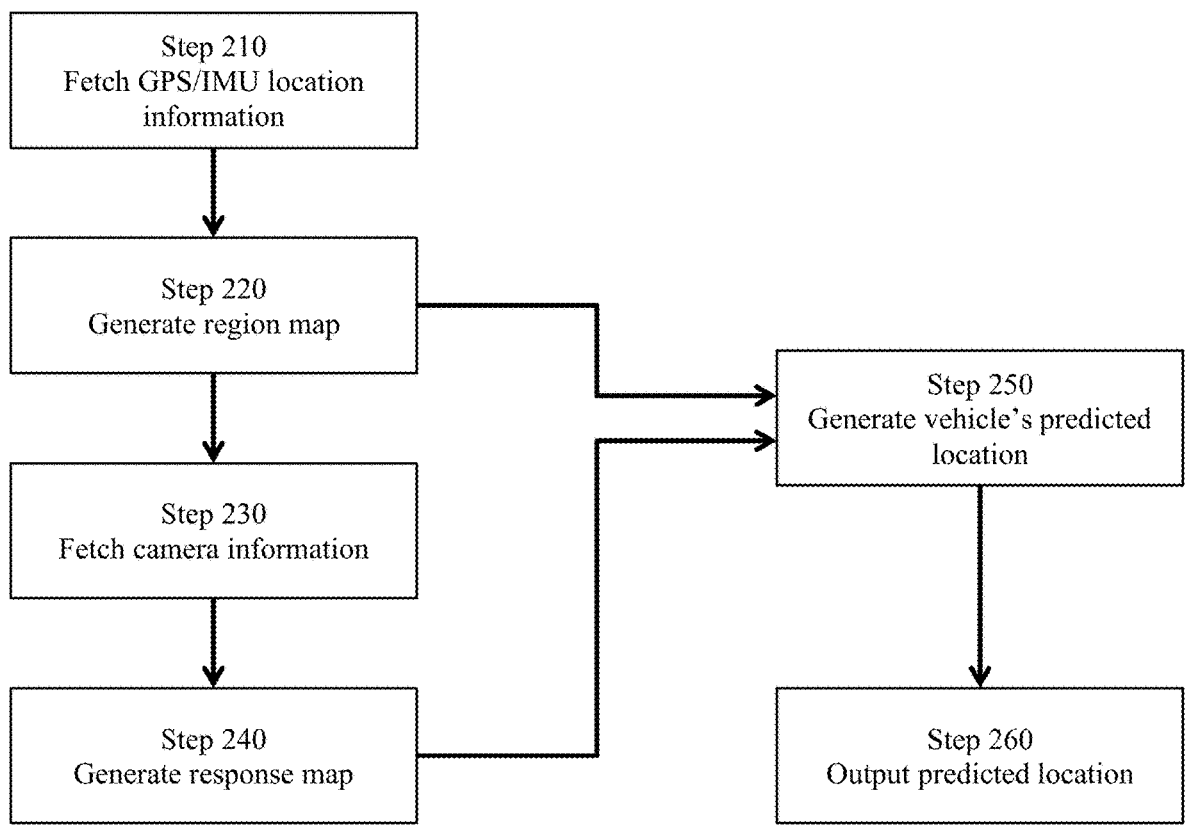
FIG. 2 illustrates a method for determining a vehicle's position within a lane, according to an exemplary embodiment of the present disclosure.

FIG. 2 illustrates a method 200 for determining a vehicle's position within a lane, according to an exemplary embodiment of the disclosure. At step 210, a computer fetches GPS and/or IMU location information from an GPS device and/or an IMU device. At step 220, the computer generates a region map comprising previously-gathered information relating to the environment in which the vehicle is traveling. For example, the region map comprises information previously gathered by a collection vehicle using radar, LIDAR, GPS, and/or cameras. Such information pertained to the collection vehicle's location on a specific roadway relative to other roadways in the area, lane-specific information relative to the lane in which the collection vehicle is traveling, and information relating to the collection vehicle's speed, direction of travel, and/or velocity relative to the location information. In one embodiment, the computer generates the region map. In another embodiment, the computer receives the region map from a database.

At step 230, the system utilizes a camera installed on the vehicle. In one embodiment, the camera is installed on the vehicle having a predetermined viewing angle and orientation. For example, the camera is installed on the roof of the vehicle, centered on the vehicle's centerline, and pointing in the direction of travel, i.e., forward. The camera captures an image of the region in front of the vehicle. In another embodiment, the camera may capture video and/or photographic images at a predetermined frame rate. In another embodiment, the camera captures infrared and/or ultraviolet light. In one embodiment, the camera captures images at a predetermined rate. In another example, the camera captures images at a rate of at least 10 images per second.

At step 240, the system generates a response map based on information fetched from the camera. The response map may be generated in real-time or in near real-time. The response map may be generated on a predetermined interval, for example, 20 times per second. In one embodiment, the system uses an image fetched from the camera and identifies lane markers within the lanes of vehicle travel depicted in the image. The camera may identify other aspects of the roadway including, but not limited to, bridges, signs, barriers, street lights, and buildings. In one embodiment, the computer comprises computer-executable code configured to detect permanent and/or semi-permanent structures within a two-dimensional image. In such an embodiment, the computer analyzes the image captured from the camera and identifies lane indicators such as painted lines and reflectors. The computer may also identify other structures such as bridges, signs, barriers, street lights, and buildings. The computer may generate a response map on a predetermined interval. In one embodiment, the computer generates a response map at least ten times per second.

At step 250, the system generates the vehicle's predicted location and calculates a confidence score for determining the vehicle's lateral position within a lane. For example, the system determines the predicted location by comparing the region map against the response map. In such an embodiment, the system samples various points within the region map identifying lanes of vehicle travel. The system samples the response map and identifies lanes of travel depicted therein. The system then compares this sampled region map to the response map and generates the vehicle's predicted location based on the differences in the perspectives of the region and response maps. In such an embodiment, the system takes the GPS/IMU information, the region map, and the response map as arguments in calculating the vehicle's predicted location. For example, if the region map is substantially the same as the response map but skewed to the left, the system's comparison recognizes the vehicle's actual position must be to the right of the GPS location. The system generates a predicted vehicle location based those differences.

In another embodiment, at step 250, the system calculates a confidence score. In one embodiment, for example, where the region map and the response map are identical, the system generates a confidence score of 1.000. In such an example, the environment data was gathered using a collection vehicle that was located at the same physical location with the same orientation of that of the system's vehicle. The confidence score reflects the system's confidence in the vehicle's predicted position compared to its position according to the region map, relative to the vehicle's lateral position within a lane. For example, a score of 1.000 correlates to a confidence of 100% and a score of 0.000 correlates to a confidence of 0%.

At step 260, the system outputs a predicted location. In one embodiment, the system may output the predicted location to an automated self-driving system. In another embodiment, the system may output the predicted location to an ADAS. In another embodiment, the system may output a corrected location if the confidence score is below a predetermined threshold. For example, the score threshold is set at 0.900. If the system generates a confidence score of anything less than 0.900, for example, a score of 0.85, the system generates a corrected location based on the comparison of the sampled region map and the response map. In an embodiment, the mathematical variance may be used as a confidence score. Further, if the system generates a confidence score of, for example, 0.950, the system outputs the vehicle's position as determined by the GPS/IMU information. In another embodiment, the system outputs the corrected location to an ADAS and/or an automated self-driving system. In another embodiment, the mathematical variance is used as the confidence score.

Figure 3A:
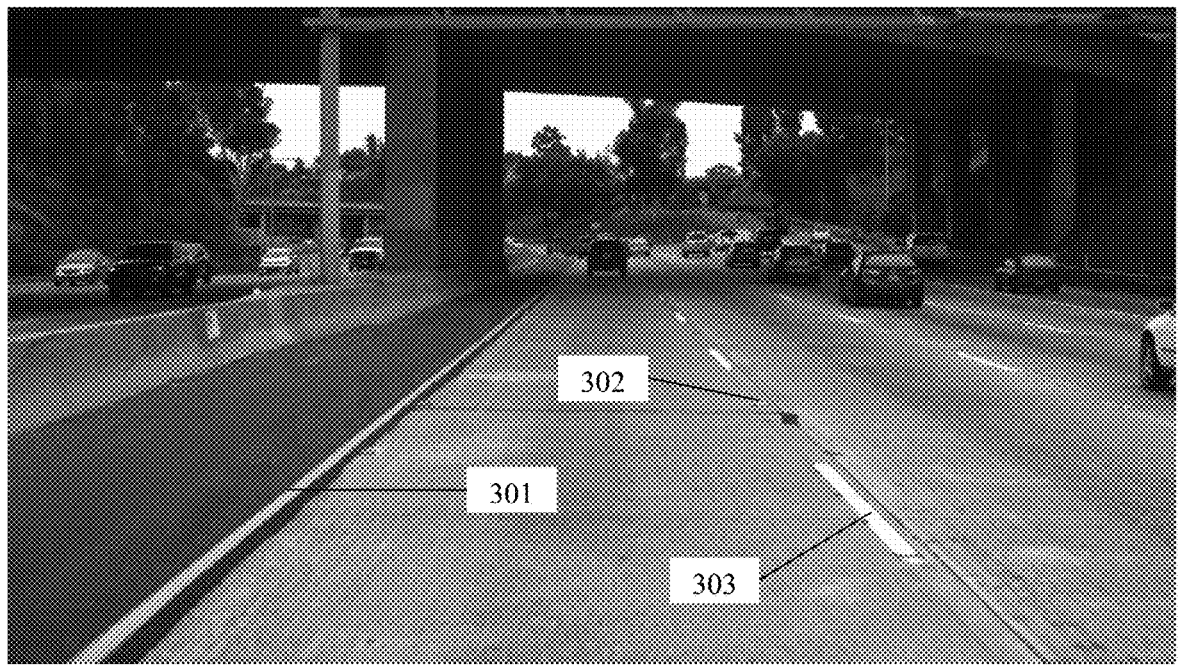
FIG. 3A illustrates an image taken by the camera, according to an exemplary embodiment of the present disclosure.

FIG. 3A illustrates an image taken by a single camera 120. Here, the camera 120 is facing the direction of travel. In other embodiments of the disclosure, the camera is positioned such that the view captured is not the direction of travel, e.g., facing behind the vehicle or to either side. In other embodiments of the disclosure, a plurality of cameras may be used. As disclosed herein, the camera may be installed anywhere on the vehicle having any orientation that allows the camera to view the vehicle's environment. When the camera is installed on the vehicle, the system may be updated as to the camera's positioning relative to the rest of the vehicle and the direction of travel. The system 100 analyzes the image taken by the camera and creates a response map by detecting lane markers such as sold lines 301, striped lines 303, and reflectors 302. In one embodiment, the camera may be permanently installed on the vehicle. For example, the camera may be integrated into the vehicle's rearview mirror or a bumper. In another embodiment, the camera may be temporarily installed on the vehicle. In another embodiment, the camera utilized may be included in a mobile device such as a cell phone or tablet. In such an embodiment, the mobile device may be temporarily installed on the vehicle and easily removed by a user.

Figure 3B:
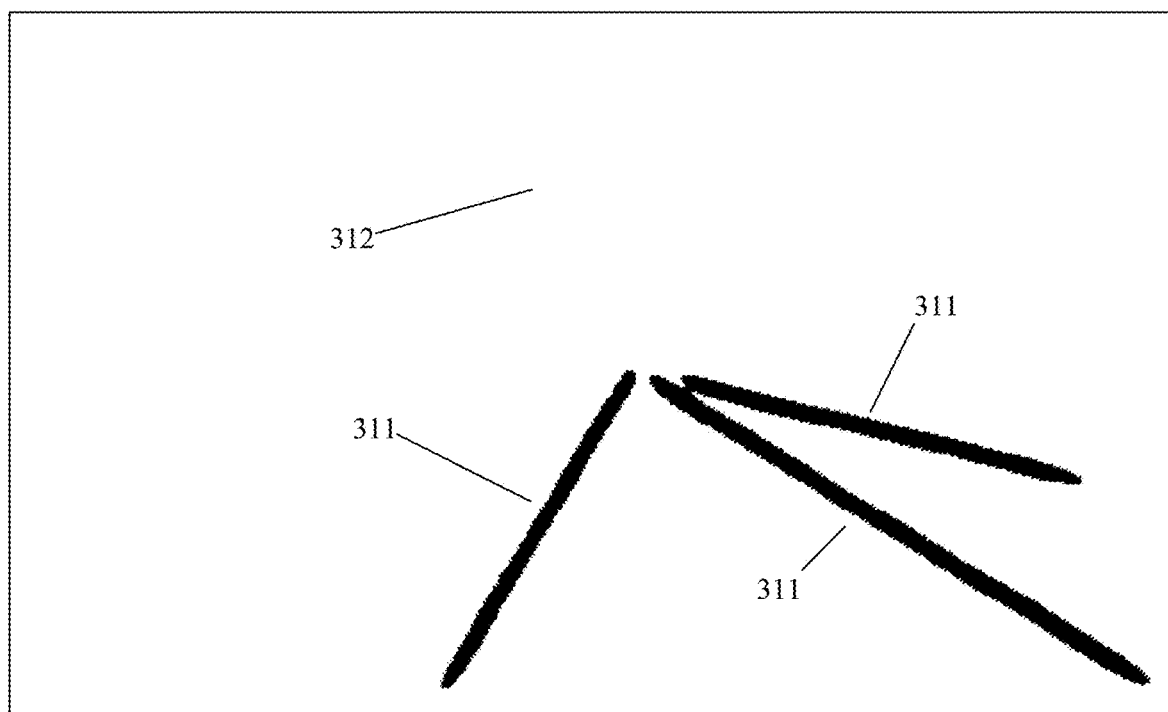
FIG. 3B illustrates a response map, according to an exemplary embodiment of the present disclosure.

FIG. 3B illustrates an exemplary response map according to an embodiment of the disclosure. The response map reflects lane markings as recognized by the system. For example, the response map is a binary map indicating lane markings 311 shown as black lines. In such an embodiment, the system analyzes the location information for lane indicators. When the system identifies a lane indicator, it plots a point on the response map (depicted as a black dot against a white background). Everything other than the relevant lane markings 311 are shown as white space 312. The system plots a plurality of lane indicators on the response map, culminating as lane markers 311. The system may also use physical structures such as bridges, barriers, signs, and buildings to determine lane markings.

In one embodiment, the computer 160 comprises computer-executable, non-transient code configured to detect certain elements with an image. For example, the computer 160 recognizes lane markings within a roadway including painted solid lines 301, painted striped lines 303, and reflectors 302. The system generates the response map as a series points, culminating a lane marking lines 311. The response map represents the road ahead of the vehicle, viewed from the camera 150 and perceived by the computer 160. In other embodiments, the lane markings 311 reflect other structural components such as bridges, signs, and barriers (not shown).

Figure 3C:
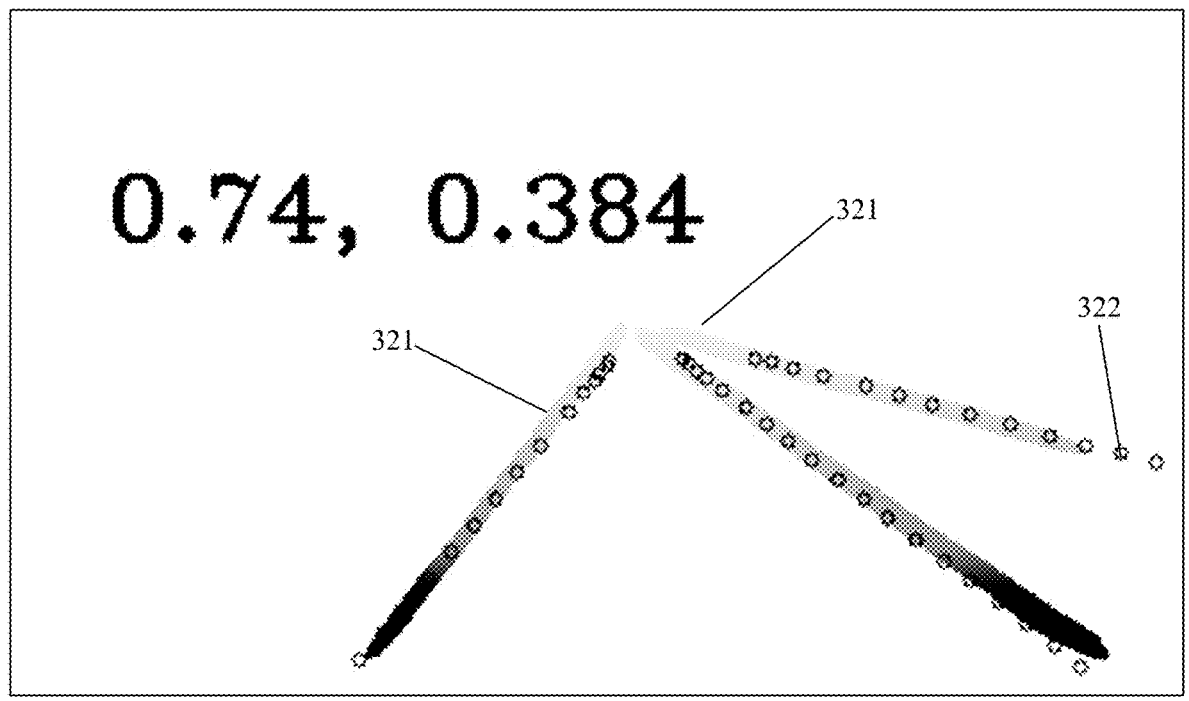
FIG. 3C illustrates a lane map, according to an exemplary embodiment of the present disclosure.

FIG. 3C illustrates a lane map, according to an embodiment of the present disclosure. The lane map comprises a comparison of the region map against the response map. The region map is compiled using images, GPS, radar, and/or LIDAR information. The system plots plurality of region map points 322 (shown as circles). The region map points 322 reflect lane markings as detected in the environment data 130. The response map comprises a plurality lines 321 (shown as grey lines) indicating the lane markers as viewed from the camera and perceived by the computer. The computer analyzes the differences between the region map and the response map and generates the vehicle's predicted location.

Figure 4:
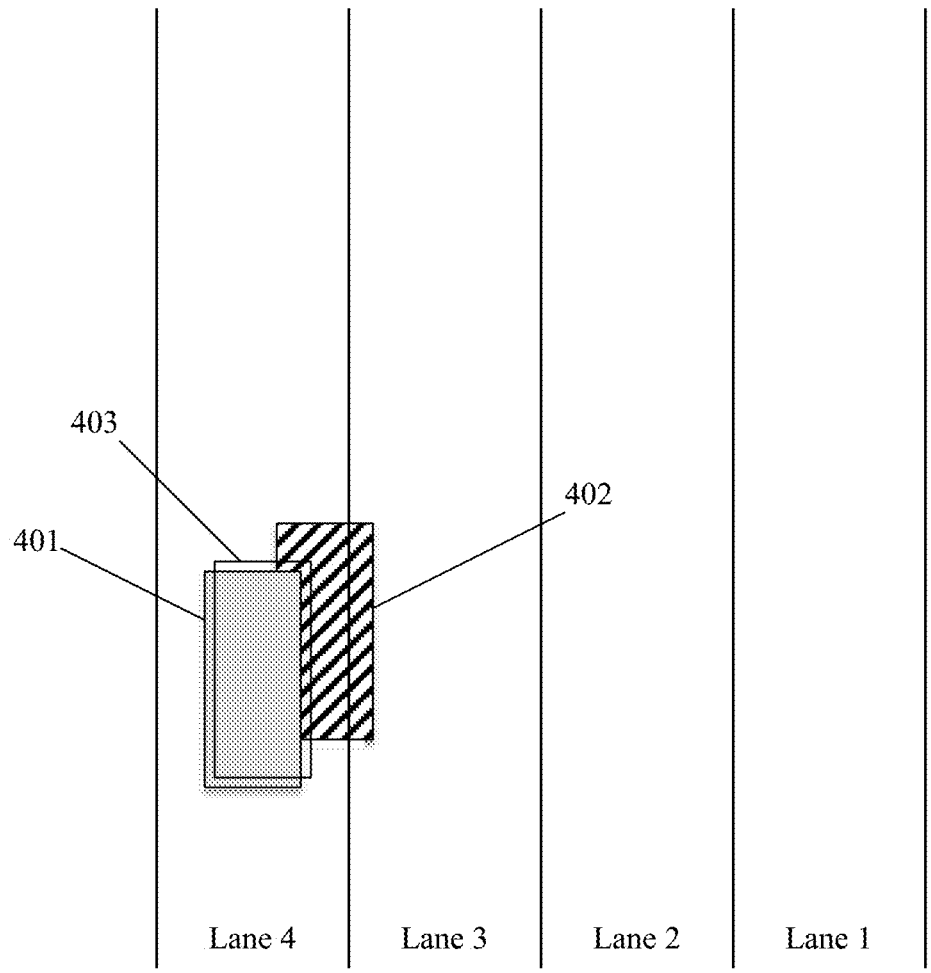
FIG. 4 illustrates updated vehicle location, according to an exemplary embodiment of the present disclosure.

In another embodiment, the system determines a confidence score based on the differences in the lane map, which is shown in the top-left corner. For example, a perfect match overlays with 100% accuracy, resulting in a score of 1.000 (not shown). In another example, the system may determine a score of 0.74 where the overlay is a 74% match (as shown). In such an embodiment, the overlay is close, but the region map points 322 differs from the points from the response map lines 321 at some, but not all of the region map points 322. In such an embodiment, the score threshold may be 0.90, and in such an instance, the system would output a predicted vehicle location by analyzing the differences in the lane map. In another embodiment, the system may also determine other statistical parameters, such as the variance. In such an embodiment, the variance is calculated, for example, of 0.384 (as shown). For example, a logistic function may be used to calculate the variance, such as:

$$\text{variance} = \frac{x_{min} + (x_{max} - x_{min})}{1 + e^{S(Gx-m)}}$$

where,
$x_{min}$=the minimum value
$X_{max}$=the maximum value
S=the steepness
G=the growth rate
x=the matching score of the response map
m=the midpoint FIG. 4 illustrates an updated vehicle location, according to an embodiment of the present disclosure. The predicted location 401 is determined using GPS and/or IMU locating information. The GPS location 402 represents where the GPS perceives the vehicle to be relative to the lanes of travel. Notably, the GPS location 402 often varies greatly from the vehicle's actual location 403. Where the score is below a predetermined threshold, the system determines the predicted location 401 and outputs that location. In such an embodiment, the system recognizes which lane of traffic the vehicle is traveling. In other embodiments, the system determines the vehicle's predicted location 401 regardless of the confidence score. In other embodiments, the system may use the confidence score to determine the vehicle's predicted location 401.

Although a lane marking localization system has been shown and described, lane marking localization systems may be implemented according to other embodiments of the disclosure. For example, the system may utilize a plurality of cameras or other information gathering devices such as radar or LIDAR. Other embodiments of the disclosure may utilize a plurality of external or internal databases, on which relevant information is stored. Other embodiments also include those that output information to vehicle driving aids such as navigation and ADAS systems.

In an embodiment of the disclosure, the methodologies and techniques described herein are implemented on a special purpose computer programmed to determine lane marking and relative vehicle position. In an embodiment of the disclosure, the special-purpose computer comprises an embedded system with a dedicated processor equipped as part of a vehicle. In other embodiments, some or all of the components of the present disclosure may be integrated as part of a mobile device, for example, a cell phone or a tablet. The disclosure has been described herein using specific embodiments for the purposes of illustration only. It will be readily apparent to one of ordinary skill in the art, however, that the principles of the disclosure can be embodied in other ways. Therefore, the disclosure should not be regarded as being limited in scope to the specific embodiments disclosed herein, but instead as being fully commensurate in scope with the following claims.

We claim:

1. A method of determining a vehicle's location, comprising:
    approximating the vehicle's region;
    receiving a region map from a database, wherein the region map corresponds to the vehicle's approximated region and comprises a plurality of region points indicating an expected roadway lane, wherein the region map comprises information gathered by a collection vehicle equipped with at least one lane sensing device, and wherein the collection vehicle's location in relation to lane markers is determined using the at least one lane sensing device;
    receiving a response image generated by an imaging device of one or more imaging devices of the vehicle, the response image comprising information relating to the vehicle's environment;
    generating a response map from the response image, the response map comprising a plurality of response points indicating the vehicle's location, wherein the response map is generated by identifying lane indicators in the response image;
    comparing the response map to the region map to determine (a) differences between the plurality of response points and the plurality of region points, and (b) a confidence score that comprises a variance that is computed using a logistic function; and
    predicting the vehicle's roadway position relative to the collection vehicle's position determined in relation to the lane indicators based on the confidence score and the differences between the plurality of response points and the plurality of region points.

2. The method of claim 1, wherein the vehicle's region is approximated using a Global Positioning System (GPS) device or an inertial measurement unit (IMU) device.

3. The method of claim 1, wherein the generating the response map further comprises:
   detecting lane markers in the response image, the lane markers pertaining to physical aspects contained in the response image; and
   plotting the response points on the response map, the response points indicating locations of the lane markers.

4. The method of claim 1, further comprising:
   generating, based on the differences, a confidence score.

5. The method of claim 1, wherein the response image is generated from radar sensing equipment, light detection and ranging (LIDAR) sensing equipment, Global Positioning System (GPS) sensing information, and/or images.

6. The method of claim 1, wherein the region map and the response map are compared at a selected frequency.

7. The method of claim 6, wherein the selected frequency is at least 20 cycles per second.

8. The method of claim 1, further comprising:
   outputting the vehicle's predicted location to an advanced driver-assistance system (ADAS).

9. The method of claim 1, wherein each of the one or more imaging devices is adapted to perceive different aspects of the vehicle's environment.

10. A system for determining a vehicle's location on a roadway, comprising:
    a locating device adapted to determine a vehicle's geographic region;
    a database comprising a plurality of region maps, each region map of the plurality of region maps comprising a plurality of region points;
    an imaging device adapted to perceive information relating to the vehicle's environment, the imaging device comprising a camera that includes a depth sensor;
    a processor operably connected to the locating device, the database, and the imaging device, the processor, at a predetermined frequency, adapted to:
        receive, from the locating device, the vehicle's determined geographic region;
        receive, from the database, a region map from the plurality of region maps corresponding to the vehicle's determined geographic region, wherein the region map comprises information gathered by a collection vehicle equipped with at least one lane sensing device, and wherein the collection vehicle's location relative to lane markers captured in the region map is determined using the at least one lane sensing device;
        receive, from the imaging device, information perceived relating to the vehicle's environment;
        generate, using the information from the imaging device, a response map, the response map comprising a plurality of response points corresponding to lane markers detected within the response map;
        compare the response map to the region map;
        determine, based on comparing the response map and the region map, a confidence score that comprises a variance that is computed using a logistic function; and
        determine the vehicle's predicted roadway position relative to the collection vehicle's position determined relative to the lane markers detected within the response map based on the confidence score and comparing the region map and response map.

11. The system of claim 10, wherein the locating device comprises a Global Positioning System (GPS) device or an inertial measurement unit (IMU) device.

12. The system of claim 10, wherein the imaging device further comprises a light detection and ranging (LIDAR) device.

13. The system of claim 10, wherein the predetermined frequency is at least 20 cycles per second.

14. The system of claim 10, wherein the processor is further configured to output the vehicle's predicted location to an advanced driver-assistance system (ADAS).

15. The system of claim 10, wherein the processor is further configured to:
    compare the confidence score to a threshold; and
    output the vehicle's predicted roadway position based on the confidence score being lower than the threshold.

16. The system of claim 10, further comprising a plurality of imaging devices, each adapted to perceive different aspects of the vehicle's environment.

17. The system of claim 15, wherein the variance is computed as:

$$\text{variance} = \frac{x_{min} + (x_{max} - x_{min})}{1 + e^{S(Gx-m)}},$$

wherein x is a matching score of the response map, $x_{min}$ is a minimum value of the response map, $x_{max}$ is a maximum value of the response map, S is a steepness parameter, G is a growth rate parameter, and m is a midpoint of the response map.

18. The system of claim 10, wherein the response map is generated using a camera pointing in a direction opposite to a direction of travel of the vehicle.

19. A method of determining a vehicle's location, comprising:
    approximating the vehicle's region;
    receiving a region map from a database, wherein the region map corresponds to the vehicle's approximated region and comprises a plurality of region points indicating an expected roadway lane that was gathered by a collection vehicle equipped with lane sensing devices;
    receiving a response image generated by at least one imaging device of a plurality of imaging devices of the vehicle, wherein the at least one imaging device comprises a camera, and wherein the response image comprises information relating to the vehicle's environment;
    generating a response map from the response image, the response map comprising a plurality of response points corresponding to lane markers detected within the response image;
    comparing the lane markers in the response map to the expected roadway lane in the region map using the plurality of response points and the plurality of region points;
    generating, based on differences between the plurality of response points and the plurality of region points, a confidence score that comprises a variance that is computed using a logistic function; and
    predicting the vehicle's roadway position relative to the collection vehicle's position determined relative to the lane markers based on the confidence score and the differences between the plurality of response points and the plurality of region points.

20. The method of claim 19, wherein the camera is configured to capture infrared light and/or ultraviolet light.

* * * * *